(12) United States Patent
Baart et al.

(10) Patent No.: US 11,752,532 B2
(45) Date of Patent: Sep. 12, 2023

(54) METAL SUBSTRATE PROVIDED WITH TAILORED SURFACE TEXTURES AND METHOD FOR APPLYING SUCH TEXTURES ON METAL SUBSTRATES

(71) Applicant: TATA STEEL NEDERLAND TECHNOLOGY B.V., Velsen-Noord (NL)

(72) Inventors: Pieter Baart, Heiloo (NL); Jan Bottema, Santpoort-Zuid (NL); David Thomas Allan Matthews, Borne (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 46 days.

(21) Appl. No.: 16/975,919

(22) PCT Filed: Mar. 15, 2019

(86) PCT No.: PCT/EP2019/056521
§ 371 (c)(1),
(2) Date: Aug. 26, 2020

(87) PCT Pub. No.: WO2019/175370
PCT Pub. Date: Sep. 19, 2019

(65) Prior Publication Data
US 2020/0406322 A1 Dec. 31, 2020

(30) Foreign Application Priority Data

Mar. 16, 2018 (EP) ..................... 18162277

(51) Int. Cl.
*B21B 1/22* (2006.01)
*B23K 26/352* (2014.01)
(Continued)

(52) U.S. Cl.
CPC ............... *B21B 1/227* (2013.01); *B21B 1/26* (2013.01); *B23K 26/355* (2018.08); *B32B 3/28* (2013.01);
(Continued)

(58) Field of Classification Search
CPC .......... B21B 2261/14; B21B 2001/228; B21B 1/227; B21B 1/26; B23K 2101/006;
(Continued)

(56) References Cited

U.S. PATENT DOCUMENTS 3,645,859 A * 2/1972 Damm, Jr. ............. C25D 11/34
205/229
5,578,143 A * 11/1996 Koyama ............... B32B 15/011
148/903

(Continued)

FOREIGN PATENT DOCUMENTS

WO 2017125497 A1 7/2017

OTHER PUBLICATIONS

International Search Report and Written Opinion dated Apr. 4, 2019 for PCT/EP2019/056521 to Tata Steel Nederland Technology B.V. filed Mar. 15, 2019.

*Primary Examiner* — Michael E. La Villa
(74) *Attorney, Agent, or Firm* — Vorys, Sater, Seymour and Pease LLP

(57) ABSTRACT

A metal substrate provided with surface textures wherein different texture patterns are provided over predefined surface areas of the metal substrate and wherein the different texture patterns are tailored to predefined surface properties of a product which is to be made out of the metal substrate as well as to a method for applying such surface textures on the metal substrate.

20 Claims, 9 Drawing Sheets

(51) Int. Cl.
  *B32B 3/00* (2006.01)
  *C23C 2/26* (2006.01)
  *B32B 3/28* (2006.01)
  *B32B 3/30* (2006.01)
  *F16S 1/00* (2006.01)
  *F16S 1/04* (2006.01)
  *F16S 1/06* (2006.01)
  *B21B 1/26* (2006.01)
  *B23K 101/18* (2006.01)
  *B23K 101/00* (2006.01)
  *B23K 101/16* (2006.01)

(52) U.S. Cl.
  CPC ............... *B32B 3/30* (2013.01); *C23C 2/26* (2013.01); *F16S 1/00* (2013.01); *F16S 1/04* (2013.01); *F16S 1/06* (2013.01); *B21B 2001/228* (2013.01); *B21B 2261/14* (2013.01); *B23K 2101/006* (2018.08); *B23K 2101/16* (2018.08); *B23K 2101/18* (2018.08); *B23K 2101/185* (2018.08); *Y10T 428/12993* (2015.01); *Y10T 428/24942* (2015.01); *Y10T 428/249921* (2015.04)

(58) Field of Classification Search
  CPC ............ B23K 2101/16; B23K 2101/18; B23K 2101/185; B23K 25/355; C23C 2/26; Y10T 428/12993; Y10T 428/24942; Y10T 428/249921; B32B 3/28; B32B 3/30; F16S 1/00; F16S 1/04; F16S 1/06
  See application file for complete search history.

(56) References Cited

U.S. PATENT DOCUMENTS

| | | |
|---|---|---|
| 5,789,066 A | 8/1998 | De Mare et al. |
| 2011/0037734 A1* | 2/2011 | Pance ................... G06F 3/016 345/177 |
| 2014/0170377 A1* | 6/2014 | Hsu .......................... C23F 1/02 427/508 |
| 2015/0209848 A1 | 7/2015 | Kopplin et al. |
| 2015/0367443 A1 | 12/2015 | Nashner et al. |
| 2019/0009370 A1 | 1/2019 | Matthews et al. |

* cited by examiner

METAL SUBSTRATE PROVIDED WITH TAILORED SURFACE TEXTURES AND METHOD FOR APPLYING SUCH TEXTURES ON METAL SUBSTRATES

CROSS-REFERENCE TO RELATED APPLICATIONS

This is a § 371 National Stage Application of International Application No. PCT/EP2019/056521 filed on Mar. 15, 2019, claiming the priority of European Patent Application No. 18162277.0 filed on Mar. 16, 2018.

FIELD OF THE INVENTION

The invention relates to a metal substrate provided with tailored surface textures, wherein the surface textures are tailored to predefined surface properties of a product that is to be made out of the metal substrate, as well as a method to apply such tailored textures on a metal substrate.

BACKGROUND OF THE INVENTION

In the finishing of (coated) metal strip, a metal strip is subjected to levelling and/or temper rolling. With levelling the shape and form of the strip are controlled and with temper rolling the mechanical properties of the metal strip are improved by lengthening of the strip. Also the surface quality of the strip is improved as far as it concerns appearance, surface texture and surface function(ality). With the temper rolling step a texture may be transferred to the surface of the strip from the work rolls to get a certain function, such as, but not limited to, appearance, a better adhesion of paint, tribological properties and improved forming properties of the metal strip. The texturing of the metal strip is done to the requirements of the end user, for instance end users in the automotive industry.

With this known method a predefined texture is applied on the steel strip and the textured steel strip is delivered as a semi-finished product to an end-user for a certain general purpose, for instance use for outer skin surfaces in the automotive industry. The general purpose texture is not optimally tailored to specific locations on the semi-finished product, for example, strip area's which are exposed on the outer skin of an automotive body where appearance should be optimized and the edges where draw-in should be controlled by optimized tribological properties. Also deformation of the semi-finished flat product into a deformed part at the end user affects the surface texture locally where deformation takes place at different elongation rates.

Here, the limitation of the known method of temper rolling is that the tailoring of surface texture on the strip is limited by the surface area on the work roll and the roughness transfer efficiency of texture from the roll onto the strip, which is also affected by the steel strip grade.

Instead of using a textured roll to apply a texture to a metal strip, such a texture could also be applied by means of laser texturing. In WO20217125497 a method for finishing a steel strip is disclosed wherein a texture is applied to the surface of a moving steel strip, and wherein a single laser beam or a plurality of laser beams is directed at the surface of a moving steel strip, and
 the single laser beam or the plurality of laser beams are controlled to apply a predetermined texture pattern on the surface of the moving steel strip.

In order to be able to apply a texture pattern on a moving metal strip a laser beam or laser beams are used which can either be pulsed laser beams or continuous wave laser beams which modify the strip steel surface. In case a pulsed laser source is used, pulse durations in the nano-, pico or femto-second regime are preferably used, to obtain well defined textures in the μm range without that the rest of the strip or the coating is thermally affected or at least not significantly thermally affected.

With this known laser texturing method a predefined texture is applied on the steel strip and the textured steel strip is delivered as a semi-finished product to an end-user for a certain general purpose, for instance use for outer skin surfaces in the automotive industry. Since a general purpose texture is not optimally tailored to every functional area on the strip there may be noticeable differences over the whole application range.

Objectives of the Invention

It is an objective of the present invention to provide a metal substrate with textures tailored to predefined surface properties.

It is another objective of the present invention to provide a metal substrate wherein textures are applied over predefined surface areas.

It is another objective of the present invention to provide a metal substrate with textures wherein the textures corresponds to predefined surface properties of a product to be made out of the metal substrate.

It is another objective of the present invention to provide a method to apply textures tailored to predefined surface properties on a metal substrate.

It is another objective of the present invention to provide a method to apply different textures over predefined surface areas.

It is another objective of the present invention to provide a method to apply textures tailored to predefined surface properties in a cost effective manner.

DESCRIPTION OF THE INVENTION

The invention relates to a product and a method.

One or more of the objectives of the invention are realized by providing a metal substrate provided with surface textures wherein different texture patterns are provided over predefined surface areas of the metal substrate wherein the texture patterns are tailored to predefined surface properties of a product which is to be made out of the metal substrate.

By providing a metal substrate with textures tailored to the surface properties of the product that is to be made out of the metal substrate the quality of the product can be improved significantly in comparison to the same product made out of a metal substrate with a single uniform texture. This is particularly of importance for shaped products that should have a high quality finish over the total surface area, which goes for the outside of most consumer products, such as for instance cars and white goods. It is also important for industrial products where it not only comes to the quality of the finish of the product but also to special properties that outer or inner surfaces or parts thereof should have.

For the sake of clarity the term "product" and "part" are used interchangeable and could mean any intermediate product as well as a final product.

According to a further aspect it is provided that applied texture patterns are optimised for one or more properties from a group of properties comprising: paint properties, visual appearance properties, friction properties, scratch resistance properties, anti-stick properties, repellent properties.

The term paint properties is to be understood to comprise both paint appearance as well as paint adherence. The most important features for the paint properties are roughness (Ra), peak count (RPc) and waviness (Wa). Another feature in this group of properties relates to the position in which the product is or rather the different parts of the product are when paint is applied. With respect of those parts that are in a vertical or strongly inclined position when paint is applied there is a risk of sagging of the applied paint. This can be reduced or prevented by adapting the texture at those locations, typically by reducing the distance between the recesses or dimples that form of the texture. The terms recesses or dimples are used interchangeably and comprise recesses or dimples of any shape.

Paint appearance also includes aspects such as gloss and reflection and variations therein. For example the surface of a food package or car body can be made locally more glossy and elsewhere more matt. This way a "mirror" can be integrated on the surface or a text or logo can be made visible even though the whole part is painted in the same colour.

The visual appearance properties include properties such as gloss, reflection, dullness, patterns for non-painted substrates such as metal substrates for some packaging purposes.

The friction properties include friction reduction, increase of friction and stabilizing of friction, and all related aspects such as galling, lubrication and wear. The stabilizing of friction is achieved by reducing friction variation at varying operating conditions, such as varying contact pressure and/or varying sliding speed and/or varying lubrication conditions. Friction stabilisation is important in forming operations to control the material flow during forming operations as well as for reducing the risk of galling, which may occur in forming of the part. Typically the surface texture is adapted to forming operations at locations where critical conditions are expected, for example at stress concentrations. The friction properties also influence the flow of material in the press. Therefore, by locally adjusting the texture on the steel substrate, and thus the friction properties, the material flow in the press can be designed and improved to critical area's which are normally subjected to high strain and increased risk of tears.

The press performance properties include galling, scratch formation and tool pollution and are strongly linked to the friction properties. Low friction generally reduced risk of galling and tool pollution. Also, the texture affects the surface wear mechanism and can reduce galling and tool pollution. The other properties concern scratch resistance, anti-stick properties, repellent properties and also reflection properties, which properties can all be realized or improved by adapting the textures.

In order to reduce the risk of scratches on the surface in certain areas the scratch resistance can be improved by providing a more rough surface texture which makes such defects less visible. An example of such an area is the recess of a door handle in a car door, where scratches from finger nails and car keys are likely to occur.

The textures can be tailored to provide self-cleaning/anti fouling properties of the surface, which basically concerns the wettability properties of the textured surface. For example on plating for buildings, a water repellent texture (Lotus effect) can be created to significantly reduce the wettability of the surface by providing partly overlapping and deep dimples such that a pillar-like structure remains.

The texture pattern can also be optimized for touch perception. For example at locations where the consumer is expected to lift a package or touch a car door, a surface texture can be created which is perceived as different from the surrounding texture.

Typically the different textures are applied by means of laser texturing which allows to change textures by means of varying the recesses or dimples made in the metal substrate by varying the width and depth of the dimples, the number of dimples per surface area and the positioning of the dimples with respect to each other. With regard to the positioning of the dimples this can be done in a fully deterministic or in a pseudo-deterministic manner, which gives respectively a perfect array of dimples or a pseudo-random positioning of the dimples.

The control of the laser devices used for the laser texturing enables to change from one to another texture immediately, which can be either in the direction of movement between the laser device or devices and the metal substrate or any other directions thereto.

The applied texture patterns typically comprise dimples with a diameter in a range of 25-120 µm, a depth in a range of 2-12 µm and a density in the range of 100 to 10000 per square millimetre. For automotive purposes these ranges could be limited to dimples with a diameter in a range of 30-60 µm, a depth in a range of 2-6 µm and a density in the range of 180 to 600 per square millimetre. As the metal substrate will already have a first texture pattern with a respective waviness obtained from production, for example from the work rolls in the temper mill, the applied texture pattern will typically result in an alteration of the pattern and an increase in waviness. This additional waviness should preferably be minimized. Preferably, the additional waviness is below 0.1 µm, more preferably below 0.05 µm in order to obtain a good paint performance. In order to minimize the additional waviness the dimple density is at least 100 dimples per square millimetre, more preferably at least 150 dimples per square millimetre, most preferably at least 180 dimples per square millimetre.

The dimple diameter is at most 120 µm, more preferably at most 100 µm, most preferably at most 60 µm.

The dimple depth is at most 12 µm, more preferably at most 6 µm, most preferably at most 4 µm.

Dimples with these density and dimensions, will still have an acceptable waviness increase, while allowing for optimisation in other surface properties such as friction and press performance.

The applied texture pattern will preferably have a surface coverage of 30% or more to obtain good paint performance. Preferably the applied texture pattern will have a surface coverage of 80% or less, as at a higher coverage the dimples will partially intersect, resulting in an overall reduction of press performance.

The change from one texture to another texture may result in a visible transition in the appearance of the product, especially if the difference between textures are large. In order to reduce or prevent visible transitions it is further provided that between texture patterns a transition texture pattern is applied to provide a transition between texture patterns. Such a transition can be made very gradual resulting in a transition that is not or almost not visible to the human eye. Texture transitions on surface parts that will not be visible in the product are not really necessary with regard to appearance but could be necessary to compensate for tolerances with respect of forming tools used to make the product and/or the displacement of the metal substrate in the forming tool during the forming operation.

With most products a forming operation is an important step to arrive at the product. For instance in the automotive industry the outer panels are preferably made from a single blank which requires a more or less complicated forming operation wherein the occurrence of areas with large elongations are more common than not. Elongation of the metal substrate in one or more directions has direct effects on the appearance of the product because the distance between dimples in the elongation direction increases dependent on the degree of elongation.

In order to compensate for such elongation effects it is provided that the spacing between dimples is different in predefined directions. This means that the spacing between the dimples on the metal substrate are adapted to the elongation the metal substrate will be submitted to in the forming operation to arrive at the shape of the product. The distance between the dimples will be decreased in order to compensate for the elongation, which for automotive outer parts is in a range of 5-30%.

At the same time the parts that will be submitted to such a degree of elongation should have low friction to sufficiently facilitate movement of the metal substrate in the forming tool, typically a press tool with a punch and die.

The texture patterns applied to opposite sides of the metal substrate may have different textures depending whether or not that side of the metal substrate will be visible in the product and depending on the movement of that side in the forming tool.

The texture patterns are applied on basis of acquired deformation data, processing data, for instance paint application data, and desired appearances and properties for predefined areas of the product. Such data is available for almost all products that are made in larger series, which certainly applies for products in the automotive industry.

According to a further aspect the substrate is provided with reference points and wherein applied texture patterns are positioned with respect of the reference points. The reference points can be applied by making recesses or dents in the metal substrate. The reference points are also reference points for the forming tool wherein the product is formed into a predefined shape.

The metal substrate is a blank or a strip from which blanks can be cut wherein each blank has its own reference points. In the latter case the reference points are used to trigger a cutting device to cut the strip into blanks of predefined sizes. The metal could in principle be any metal, but in most cases will be steel, which for automotive purposes comprises high strength steels for instance for parts such as A, B, C, (D) pillars, and also softer better formable steels for outer panels.

According to a further aspect of the invention a method is provided for applying surface textures on a metal substrate wherein the method comprises the steps of:
  collecting data concerning dimensions, shape, forming operation and predefined surface properties of a product which is to be made out of the metal substrate,
  applying one or more texture patterns on the metal substrate wherein the texture patterns are applied on basis of the collected data such that the product has the predefined surface properties.

The data relating to the product comes from the party that manufactures the product which in most cases will be a different party than the party that manufactures the metal substrate, for instance the automotive industry at the one hand and the steel industry on the other hand. In particular of products which are made in large series and which should have a high quality finish, such as in the automotive industry, large sets of data are available which relate to the forming operation of the product and the properties concerning the appearance of the product. The data relating to the product further comprises the material properties of the metal substrate which is important for the control of the laser devices used to apply the texture patterns.

According to a further aspect the texture pattern is optimised for one or more properties from a group of properties comprising: paint related properties, visual appearance, friction properties, scratch resistance properties, anti-stick properties, repellent properties.

In order to avoid a visible transition between texture patterns a transition texture pattern is applied to provide a transition between texture patterns. Such a transition texture pattern can be made over a rather short distance, typically in the order of millimetres. However if need be a very gradual transition can be provided which can be over a larger distance, but that is of course dependent how large the transition zone has to be in order to prevent visibility or to adapt to the friction or any other property required in the transition zone.

According to a further aspect it is provided that a texture pattern tailored for paint related properties has a roughness Ra in a range of 0.2-3 μm, a peak count RPc in a range of 30-190 per centimetre and a waviness of at most 0.35 μm. Typically a texture pattern tailored for paint related properties has a roughness Ra in a range of 0.8-1.4 μm, a peak count RPc in a range of 75-160 per centimetre, preferably 75-110 per centimetre and a waviness of at most 0.29 μm.

These aspects do not provide a unique description of a surface but are commonly used to quantify the quality of automotive outer panels. Roughness (Ra) is a surface descriptor which takes into account the mean height variation of a line profile (EN10094). Ra does not depend on the shape of the line profile, only on the area between the line profile and the mean of the line and therefore does not uniquely describe the surface profile. To give more meaning to the term "roughness" with relation to surfaces which are to be painted, an additional parameter "peak count" was introduced; it is a measure for the spacing of roughness peaks (EN10094). In the automotive industry the peak count is used as a measure for surface quality for painting. A higher peak count results in better paint adherence and smoother paint surfaces with better reflection of images. Ra and peak count are parameters defined on a short length scale, generally not very well visible for the naked eye. The parameter "waviness" is used to describe the surface height variations on also longer length scales which are well visible for the naked eye (SEP1941). Too high waviness (waviness is expressed as an amplitude of a certain frequency range) results in uneven painted surfaces, also known as orange peel. Therefore, it is of high importance to control Roughness (Ra), peak count, and waviness of metal substrate in order to realize good paint properties and good visual appearance of the surface.

The texture patterns are made by laser ablation which results in a pattern of dimples in the metal substrate. The texture patterns comprise dimples with a diameter in a range of 25-120 μm, a depth in a range of 2-12 μm and a density in the range of 100 to 10,000 per square millimetre. Typically, texture patterns comprise dimples with a diameter in a range of 35-60 μm, a depth in a range of 3-5 μm and a density in a range of 100-500 per square millimetre. The very large dimple densities up to 10000 per square millimetre are specially required to make a surface water repellent. In order to realise desired paint properties dimple densities up to 500 per square millimetre are sufficient.

The texture patterns can be applied in a fully deterministic manner resulting in perfect arrays of dimples, that is with the dimples in lines at an angle to each other, for instance in a cubic or hexagonal array. However, this may result in very visible patterns in a painted product when viewed at specific angles. For that reason the dimples are provided in a quasi-deterministic manner which prevents that these kind of unwanted interference patterns are seen when viewed at specific angles.

Another important functional aspect of the surface of the metal substrate is related to press performance. During forming of the product the surface of the substrate slides along the press tools where high contact friction and poor lubrication may result in surface damage such as galling of the substrate and in case of an applied zinc coating, zinc pollution of the press tools. To reduce these effects, the current solution is to use extremely smooth (low Ra) tool surfaces and rather rough (high Ra) strip surfaces. The mechanism is that high roughness (Ra) on the strip helps to capture oil for good lubrication properties. This strategy of improving press performance by increasing strip roughness in critical forming conditions (e.g. bending over sharp radii) has proven to work in press shops. However, it also has a negative effect on the painting process and appearance as high roughness generally increases waviness.

In order to provide ideal paint properties, the surface waviness should be low. It has appeared that with texture patterns applied by laser ablation that it is possible to combine the desired paint properties with good forming properties, that is low waviness and high roughness.

Such a texture pattern tailored for friction properties has a roughness Ra, a peak count RPc and a waviness according to the values for paint appearance as given above and with dimples with a diameter and depth as given above but with a lower dimple density. The dimples are preferably in a range of 100-360 per square millimetre. It appeared that in mixed lubrication conditions the same small dimples as for optimal paint properties help to reduce friction coefficients.

A texture pattern for good forming properties should preferably have a high closed void volume. For good forming properties, the closed void volume should preferably be at least 600 mm$^3$/m$^2$, more preferably at least 800 mm$^3$/m$^2$ and most preferably at least 1000 mm$^3$/m$^2$. Without wishing to be bound by theory, it is believed that such closed void volumes are preferred as this corresponds to a texture pattern which has dimples which are not inter-connected. The load can be carried by the high height area's or peaks and by a hydrostatic pressure generated in the lubricant in the closed dimples. Dimples which are interconnected to dimples outside the loading area will likely generate a limited hydrostatic pressure and therefore do not contribute to the load carrying capacity as much. This integrated volume of the dimples is referred to as the closed void volume which is a known parameter by the expert in the field.

With the method according to the invention the spacing between dimples is varied dependent on deformation data. With that the stretching of the texture pattern due to elongation can be compensated for so that after the forming operation the texture pattern has the required spacing between the dimples.

It is also provided that the spacing between dimples is varied dependent on the position in which paint is applied on the product. In most cases products are painted in a fixed position, for instance suspended from a rail system, in which position the paint applied on vertical or inclined parts could sag which will be clearly visible on the product. By decreasing the distance between dimples in such areas sagging of the applied paint can be reduced or prevented.

According to a further aspect it is provided that the substrate is provided with reference points and wherein texture patterns and reference points are applied relative to each other. The reference points are applied according the information received from the manufacturer of the product, wherein the reference points are applied such that these align with the forming tools of the manufacturer of the product. With the reference points and the deformation data, desired paint appearance, position of the formed product in the paint line the metal substrate can be provided with the required texture patterns relative to the reference points at the right location on the metal substrate. With such tailored texture patterns it is no longer necessary to do concessions to quality as is the case with metal substrates that are provided with a single texture over the complete surface of the substrate as is standard practice.

In principle the metal substrate can be of any metal or metal alloy, but in most cases will be a steel strip or a steel blank. For instance Interstitial Free (IF) steels and Bake Hardening (BH) steels for the manufacturing of automotive outer panels, or tinplate for Drawn and Wall Ironing (D&I) applications for food and beverage packaging. Blanks are cut from a steel strip which can either be done at the steel manufacturer or at the manufacturer of the product. In both cases the strip is provided with information giving the right locations where to cut the strip into blanks. A straightforward manner is to provide reference points on the strip. In addition each blank can be numbered with a unique ID code to follow the blank through the process.

In case of a steel strip or blank the material will typically be provided with a metallic coating to prevent corrosion of the substrate. In most cases such a metallic coating is provided on the metal substrate before applying a texture pattern. However, when very thin coatings are applied, for instance by means of PVD, the texture patterns may be applied before applying the coating. Such coatings comprise Zn coatings and Zn alloy coatings such as ZnAl, ZnMg, ZnAlMg coatings, Cr and Cr alloy coatings, Sn and Sn alloy coatings.

The metal substrate is subjected to temper rolling, which in most cases is done before applying texture patterns. However, it is also well possible to subject the metal substrate to temper rolling after applying the texture patterns.

The roughness realised with temper rolling is typically in the range Ra=0.1-0.9 μm preferably 0.2-0.5 μm. Roughness will be further increased due to the applied texture patterns. The waviness realized with temper rolling is typically in the range 0.1-0.35 μm preferably 0.1-0.2 μm.

For paint performance, the added waviness by the texture will preferably be kept below 0.10 μm, more preferably below 0.05 μm such that the total waviness will be less than 0.35 μm preferably less than 0.25 μm on the flat substrate.

The elongation of the metal substrate as a result of temper rolling is typically in the order of 0.5-2% and for that reason the effect on dimple distance and shape is minimal. A reason for temper rolling the metal substrate after applying the texture patterns is that when a texture with large and deep dimples has been applied on the metal substrate this will result in a rim around a dimple which is clearly raised above the surface of the metal substrate. By temper rolling after such a texture has been applied the height of the rim around a dimple will be decreased and different functional properties are obtained, such as friction properties and press performance.

A product either has one side or both sides that have to meet high appearance standards, but in most cases as for instance with products for the automotive industry there is only one side that has to fulfil such high appearance standards. The opposite side is covered and will normally not be visible in which case appearance is far less important. However, the tribological properties and press performance are equally important on both sides. Accordingly it is provided that only one side of the metal substrate is provided with texture patterns or wherein different texture patterns and/or different areas are provided with texture patterns on opposite sides of the metal substrate. With a texture pattern applied according the method on only one side the other side will still have a texture resulting from the temper rolling of the metal substrate.

BRIEF DESCRIPTION OF THE DRAWINGS

The invention will be further explained on hand of the example shown in the drawing and experimental results, in which.

DETAILED DESCRIPTION OF THE DRAWINGS

Figure 1:
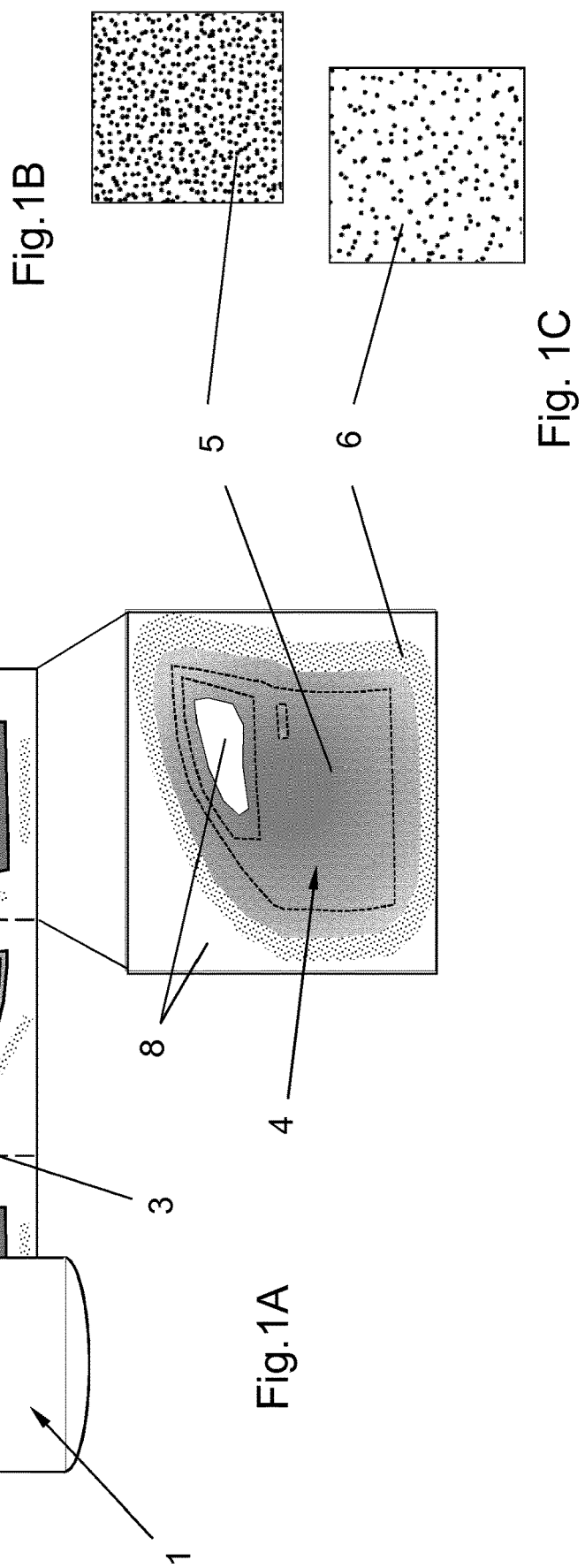
FIGS. 1A-C shows schematically a metal strip with a product that is to be made out of the strip and a number of textures applied on the strip.

In FIG. 1A schematically a metal strip 1 is shown which is divided in sections 2 indicated with a broken line 3. The broken line 3 represents reference points provided on the strip. Furthermore each section 2, or blank when cut from the strip, is provided with a unique identification code to be able to track the section 2 or blank at both the metal manufacturer and the manufacturer of the product that is made from the blank.

In the figure an imaginary representation of a product 4 is shown that will be made out of a section 2 which in this case is an outer door panel for a vehicle.

In the enlargement of a section 2 the product is indicated with broken lines which represent the product after forming the product from the blank, which typically is after forming the product in a press device. Also schematically shown in the enlargement are the different textures applied on the surface of the blank which are respectively a texture 5 optimised visual appearance of the product with paint applied and compensated for elongation (FIG. 1B) and a texture 6 optimised for reduced galling in press device (FIG. 1C).

The texture as shown in FIG. 1B is optimised for paint appearance has small dimples of little depth and with a larger density than those optimised for press performance as shown in FIG. 1C. In this example the diameter of the dimples is 30 µm, the depth is 4 µm and the density is 500/mm2. Furthermore, in order to compensate for elongation of the metal during forming of the product the spacing between the dimples is adjusted to compensate for the elongation. This means that in areas of substantial elongation the spacing between the dimples is adjusted such that after forming the spacing in the area of elongation is the same or is in the same range as that of the dimples in areas that have not undergone any elongation.

The texture as shown in FIG. 1C which is optimised for reduced galling in the press device also has small dimples but with a lower density than those of the texture optimised for paint appearance. In this example the diameter of the dimples is 30 µm, the depth is 2-4 µm and the density is 180/mm2.

The area or areas of the section 2 or blank outside the applied optimised textures have a texture 8 resulting from temper rolling of the strip 1.

All together by providing a differentiated surface texture which is in line with geometrical product specifications and forming specifications an optimum in paint appearance and press performance is realised.

Figure 2:
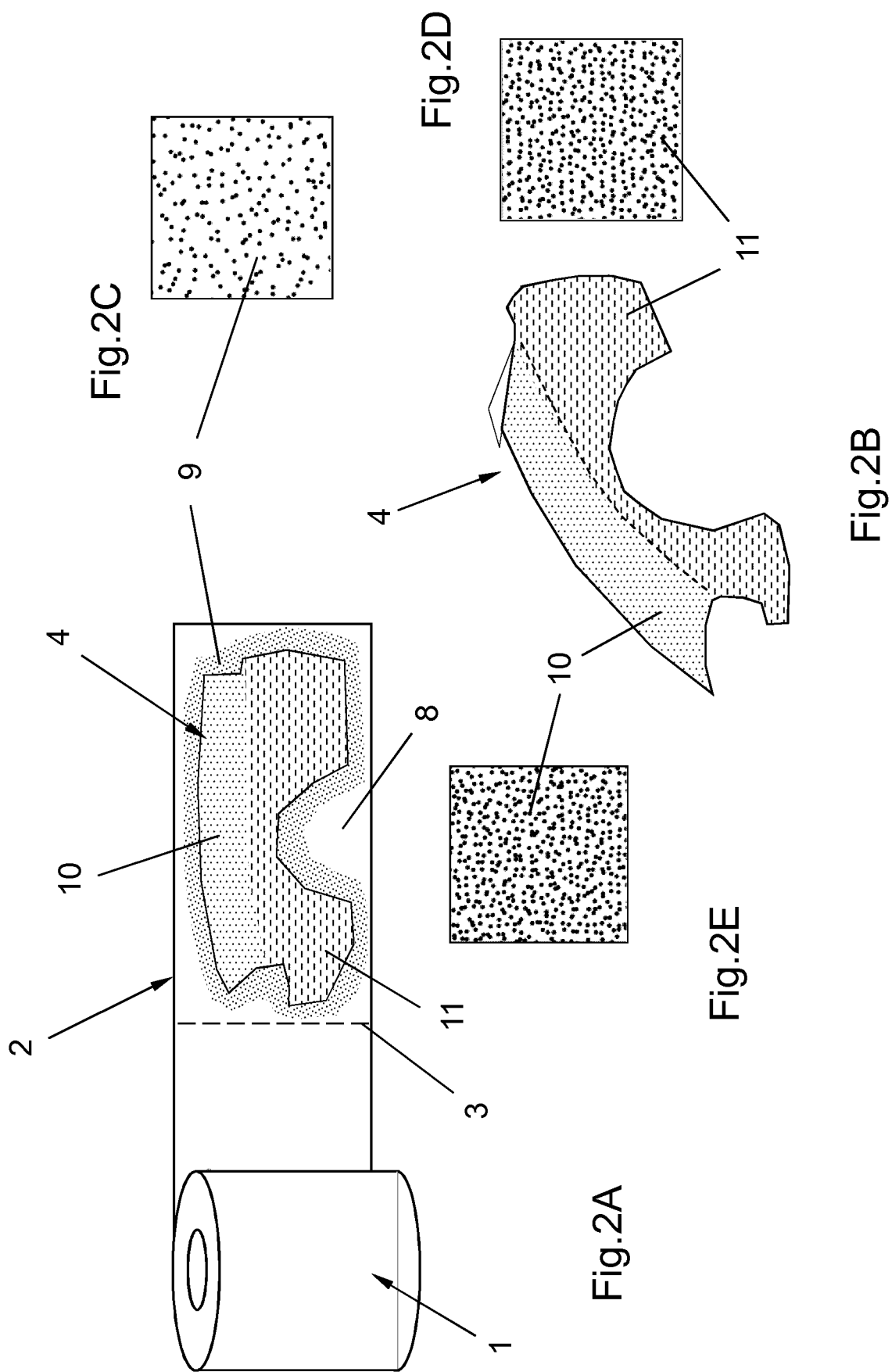
FIGS. 2A-E shows schematically a similar metal strip as in FIG. 1 with the product made out of such strip and the applied textures, FIGS. 3A,B shows schematically a product made out of a strip and a texture applied at a high elongation area.

In FIG. 2A another example of a strip 1 is shown divided in sections 2 indicated with a broken line 3 and with an imaginary representation of a product 4. The product in this example is one piece front-left fender including part of a bonnet and wheel arch. FIG. 2B shows the product after forming and trimming of the edges of the blank. The area around the imaginary representation of product 4 again is provided with a texture 9 optimised for reduced galling in the press device. The more or less horizontal and vertical parts of the formed product are provided with textures optimised for paint appearance properties. The more or less horizontal top part of the product is provided with a homogeneous texture 10 optimized for visual appearance on horizontal surfaces, see FIG. 2E. In FIG. 2D a texture 11 is shown for the more or less vertical part of the product 4 which has an optimized ratio between vertical and horizontal dimple spacing to reduce sagging of applied paint on vertical surfaces. With these more or less vertical parts the dimple spacing in a direction perpendicular to the gravitational direction is usually reduced in a range of 5-30%, which in this example is about 20%. Both textures 10 and 11 are also optimised for elongation resulting from forming the product 4. The area outside the optimised textures has a texture 8 resulting from temper rolling of the strip 1.

Figure 3:
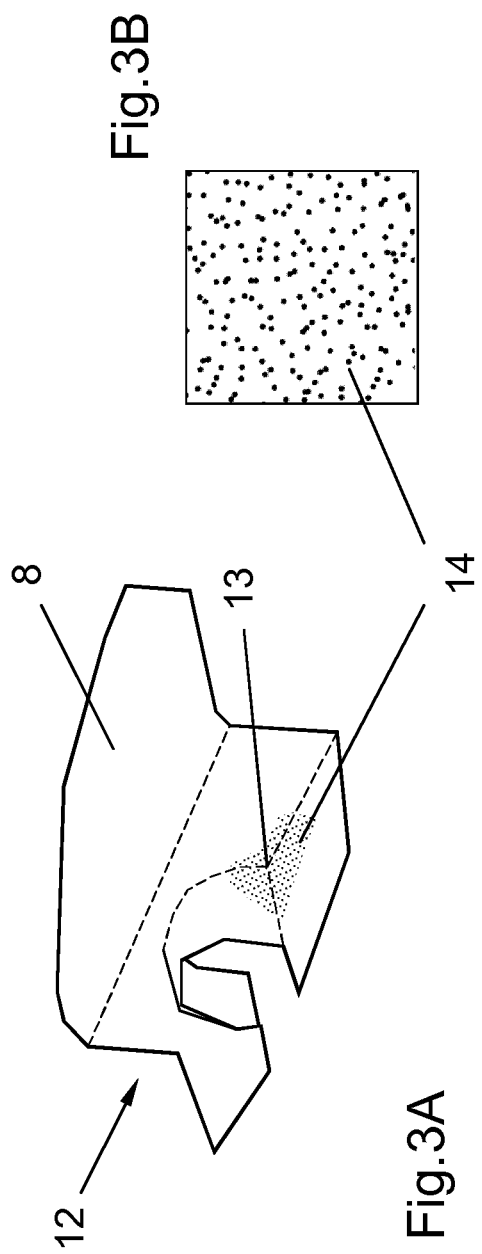

FIG. 3A shows schematically a formed product 12, in this case a part of a transmission tunnel, which does not need to have optimised textures for paint appearance since it is a part that normally will remain out of sight. The product 12 has a complex geometrical shape with a critical area in corner area 13 where large elongations of the metal are required to be able to form the product from a single blank. These large elongations can only be realized if the metal can sufficiently move between the die and punch and/or the clamps of the press device used for forming the product 4 to get the necessary material flow. For that reason the area surrounding the corner area is provided with a texture 14 (FIG. 3B) optimised for low friction and improved material flow. In this example the diameter of the dimples is 30 µm, the depth is 2-4 µm and the density is 180/mm2. The remaining surface area does not need to have a specially optimised texture and has a texture 8 resulting from temper rolling of the strip 1 which is sufficient for the purpose.

Figure 4:
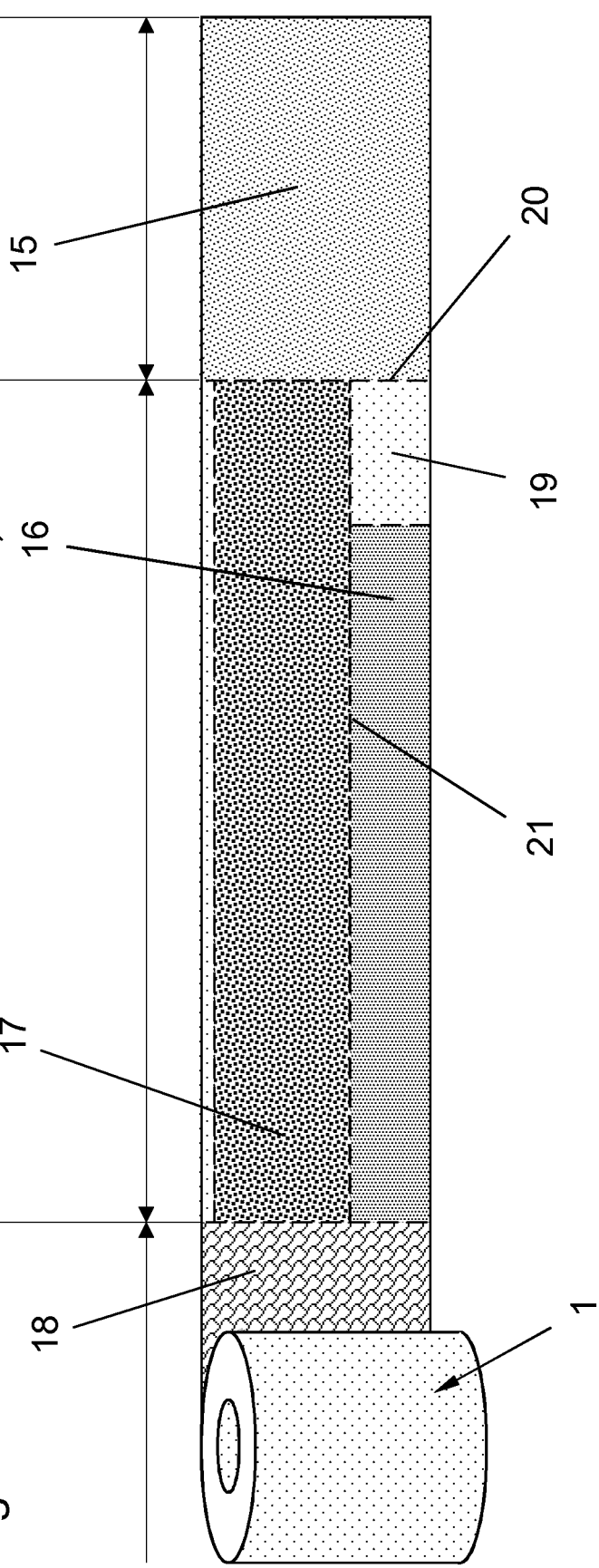
FIGS. 4A-C shows schematically a metal strip subdivided in areas with different textures for different specifications.

FIG. 4A shows a strip 1 which is divided in sections 15, 16, 17, 18, 19 both in the length direction of the strip and in a transverse direction indicated respectively with broken lines 20, 21. The broken lines 20, 21 represent reference points provided on the strip which together define the sections. Furthermore each section is provided with a unique identification code to be able to track the sections.

The sections 15, 16, 17, 18 are provided with textures according to customer specification which could be a single texture for a section but also several textures per section or a subdivision of a section in sub-sections with product optimised textures for each sub-section. Because of the laser applied textures a strip can easily be subdivided in sections of different lengths and widths over the length and width of a strip. This allows to manufacture very cost efficient low volume orders for niche markets, which otherwise would not have been possible or only against high costs. For example, this can be interesting for food and beverage packaging cans which are only made in small volume for special occasions. In order to deliver such low volume orders within a short period of time these low volume orders are preferably not first accumulated in order to be able to cover a complete length of strip, but rather short lengths of large standard strip coils with a general texture are used. The short lengths are preferably at the end or beginning of a large strip coil so that sufficient length of strip remains for the customer with high volume orders for strip with a general texture.

In the example section 15 is a product X for customer A and has a length of 0.8 km over the total width of the strip, section 16 is a product Y for customer B and has a length of 2.9 km over a limited width of the strip, section 17 is a product Z for customer A and has a length of 0.8 km over the total width of the strip and section 18, the remainder of the strip is for a bulk product K with a general texture for customer C. The general texture is typically applied by temper rolling but could of course also be applied by laser texturing.

The texture as shown in FIG. 4B is a product Y for customer B. In this example the diameter of the dimples is 30 μm, the depth is 3 μm and the density is 500/mm2. Furthermore, the dimples are patterned in a deterministic manner to realize a highly homogeneous dimpled texture.

The texture as shown in FIG. 4C is a product Z for customer A. In this example the diameter of the dimples is 60 μm, the depth is 6 μm and the density is 180/mm2. Furthermore, the dimples are patterned in a pseudo-deterministic manner to reduce any preferred orientation of the dimpled texture.

Section 19 is a small rest section of the standard strip with a general texture, which can re-enter the metal manufacturing process as scrap material.

Several texture patterns were analysed via computational analysis to study the expected paint properties and press performance. The waviness is taken as a predictive feature for paint appearance, wherein a low waviness corresponds to a good paint appearance. The closed void volume is taken as an indication for press performance, wherein a high closed void volume corresponds to good press performance. Variations in dimple density, depth and diameter were analysed on their expected influence on the surface properties of the final sheet. The dimples investigated were either round or oval shaped.

Figure 5:
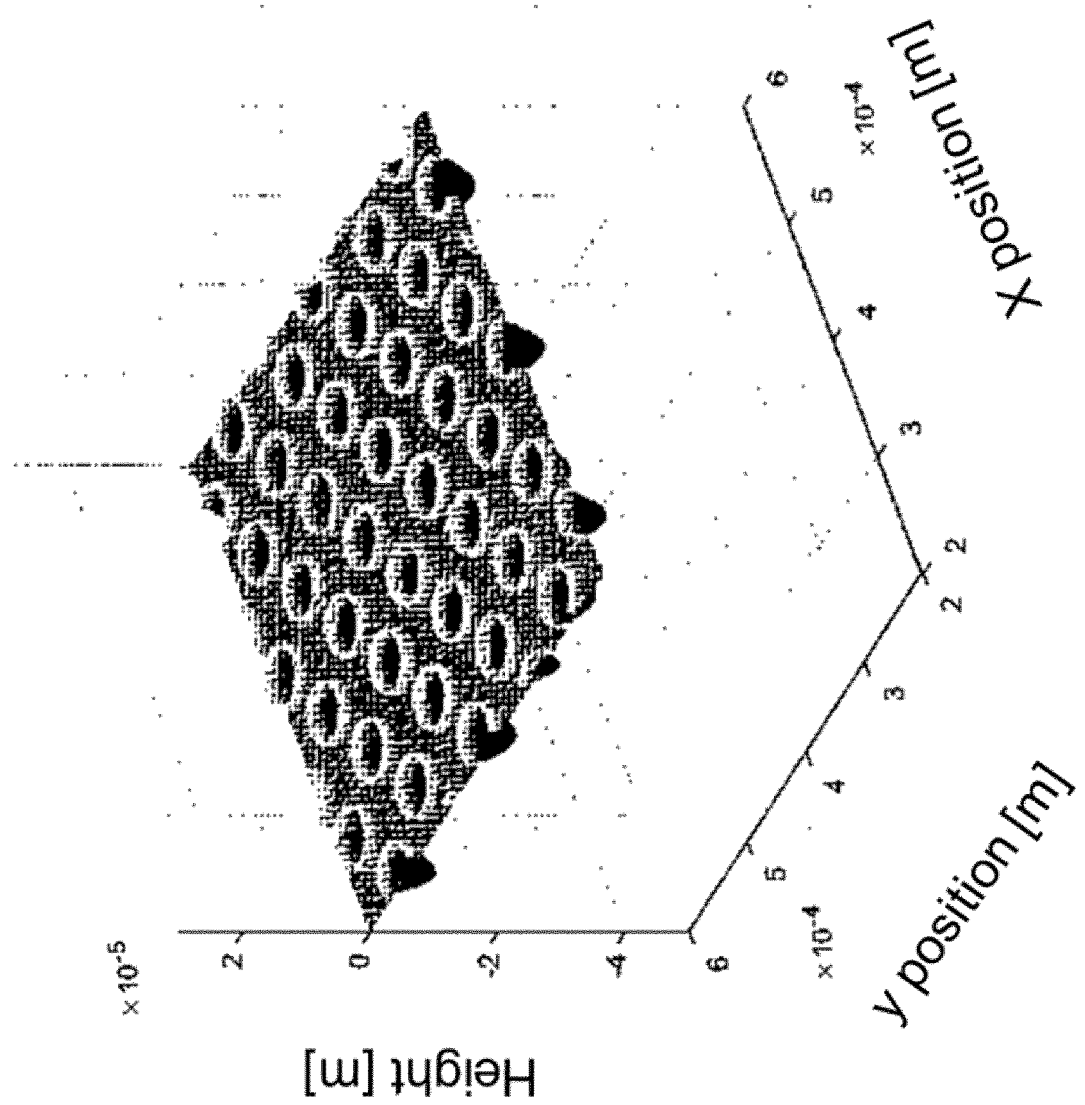
FIG. 5 shows a 3D representation of a texture pattern

In the simulation a 3D texture pattern was generated based on dimple diameter, dimple depth and dimple density. FIG. 5 shows an example of an inventive surface. This example shows a square spatial distribution of dimples which is tilted 30 degrees relative to the x axis.

Figure 6:
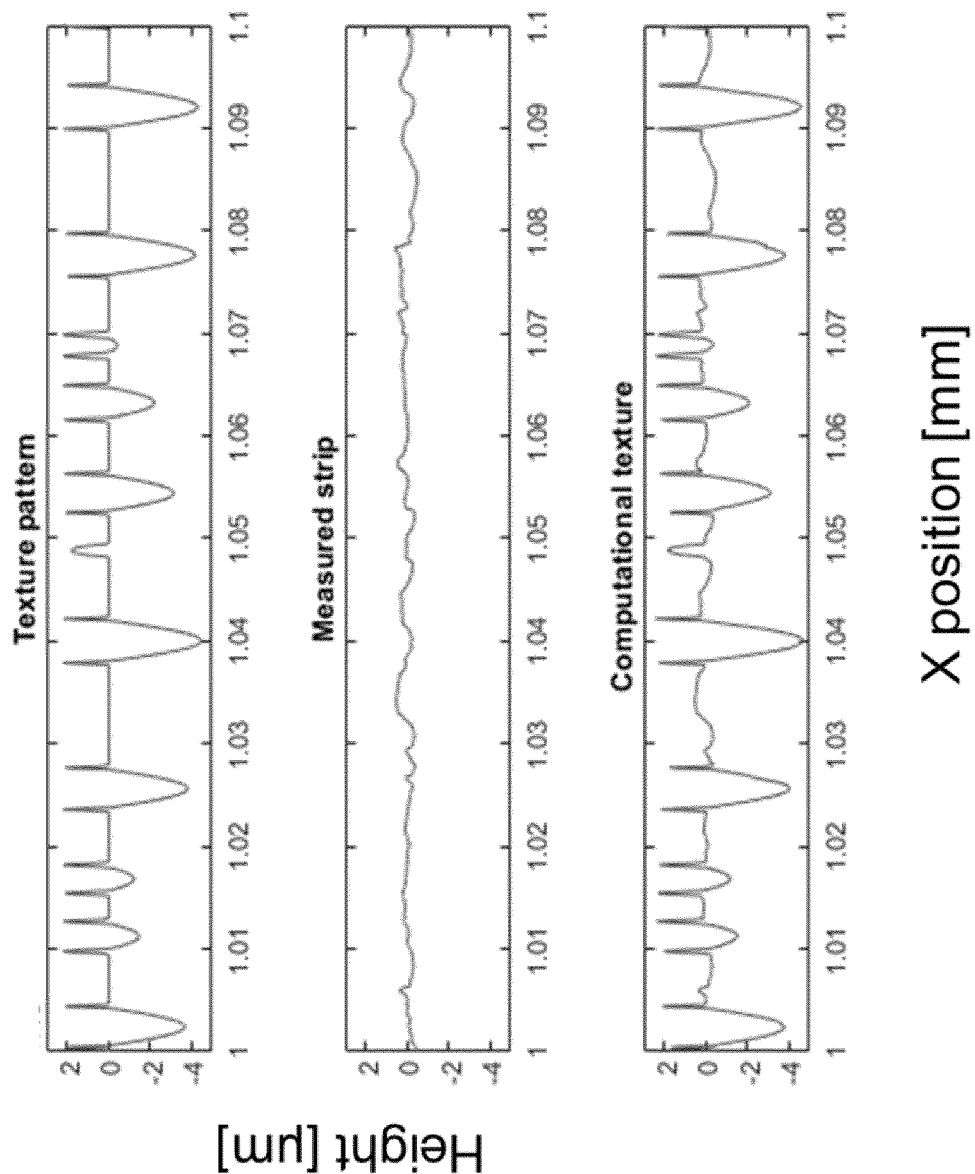
FIG. 6 shows a surface texture profile from two different texture patterns

The simulated 2D profile from which the roughness (Ra), Peak count (RPc) and Waviness (Wsa) were determined was based on two 2D texture patterns which were superposed. The first texture pattern was based on a measured strip roughness profile where the measured roughness profile height distribution has been scaled to an Ra of 0.2 μm. The measured strip was made by temper rolling with Electro Discharge Textured work rolls. An initial strip roughness (Ra) of 0.2 μm was used in the example as such a roughness preferably arises from the texture pattern obtained after smooth temper rolling. The second texture pattern is a cross section of the 3D height map parallel to the x-axis. In the computational simulation these texture patterns are superposed to generate the computational surface texture. FIG. 6 shows an example of the surface texture, with an overlay of these two different texture patterns. The total length of the computational 2D texture was 65 mm. Roughness and peak count were calculated based on EN10094 (filter cut offs λs=λc/300, λc=2.5 mm), Waviness was calculated based on SEP1941 (filter cut offs λc=1 mm, λf=5 mm).

The computational results are provided in table 1.

Comparative example C1, without dimples, has a low waviness, a low peak count and a low roughness and only one texture pattern obtained from temper rolling.

The inventive examples I1-I7 are according to the invention and have both the texture pattern from temper rolling as well as a texture pattern with dimples. The area with the texture pattern was investigated for its surface properties. It can be seen that varying the diameter, depth and density of the dimples, the waviness, peak count and roughness of the steel strip can be optimized for different purposes.

Figure 7:
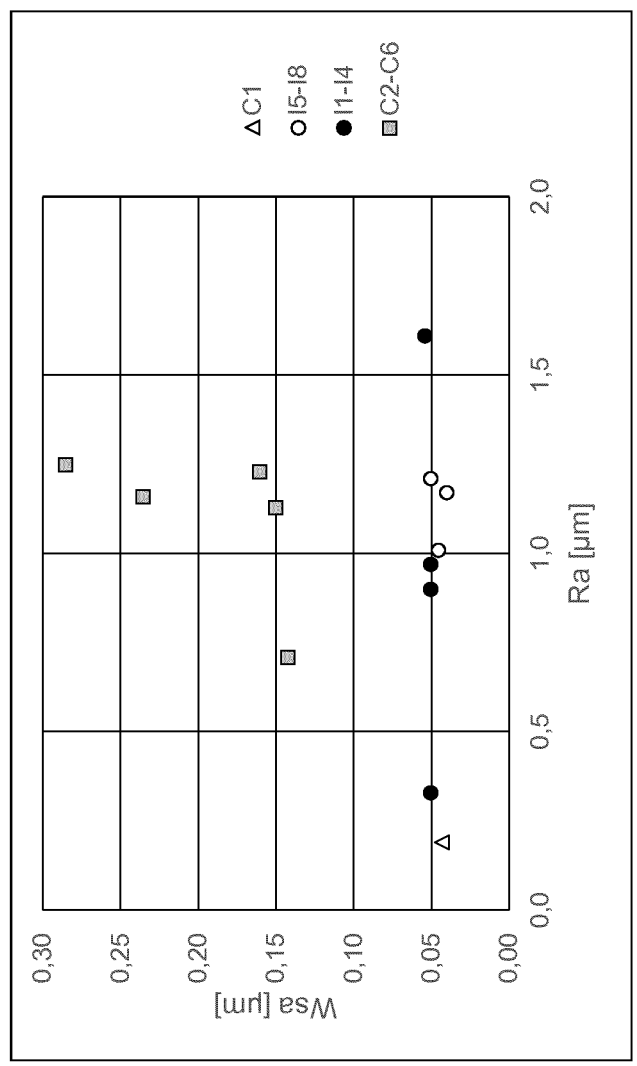
FIGS. 7-9 show data for samples according to the invention

The inventive examples I1-I7 will all have a good paint appearance (Wsa below 0.05 μm). Samples I1 and I5-I7 will all have both good paint performance and very good press performance (closed void volume above 800 mm^3/m2). Sample I3 will have good paint appearance and acceptable press performance, whereas sample I4 will likely have bad press performance. So, by applying a different surface texture next to the texture obtained from the work roll, the final properties can be tailored to the characteristic desired for the final product. Comparative examples C2-C6 have varying dimple parameters with a relative low density and show a large increase of waviness compared to the inventive examples and will therefore have bad paint appearance. The results are also visualized in FIG. 7 where it is shown that the inventive samples all have the same preferred low waviness equal or less than 0.05 μm similar to the base sample C1 on which the texture was superposed. This indicates that the texture pattern does not increase waviness of the strip while at the same time a wide range of roughness (Ra) can be realized. The comparative samples C2-C6 show a much higher waviness and will have worse paint appearance.

Figure 8:
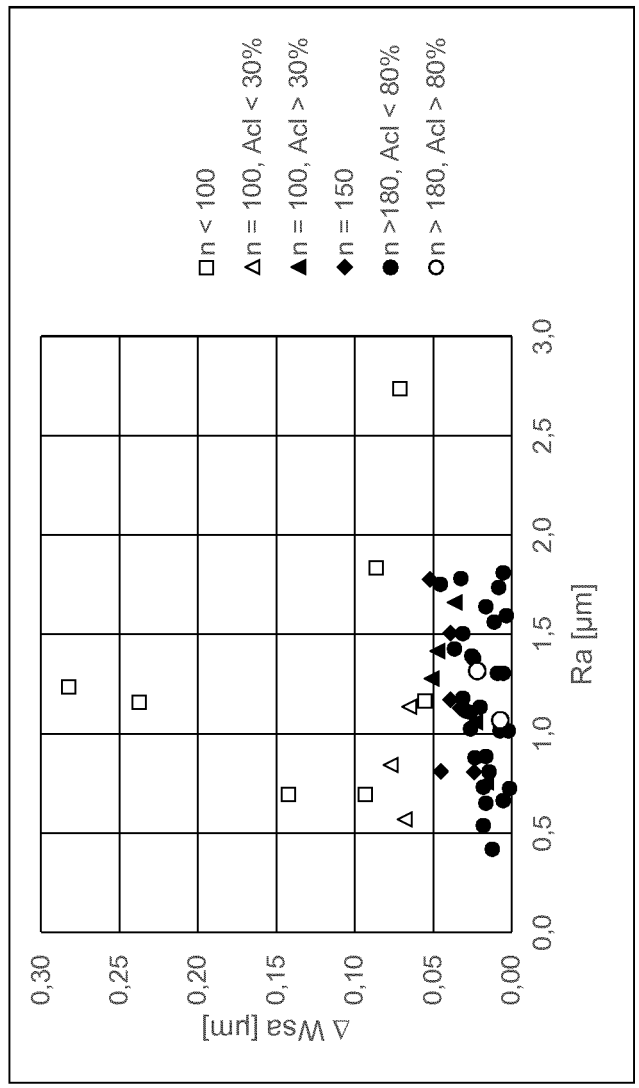

In addition to the computational samples mentioned in table 1, more surface textures were generated and plotted in FIG. 8. The textures were not superposed on the rough strip, therefore the initial waviness was 0 μm and FIG. 8 shows the additional waviness (ΔWsa). For each dimple density samples have been computed with a dimple diameter in the range of 40-80 μm and a dimple depth in the range of 2.5-5.5 μm. It can be observed from the figure that a wide range of roughness (0.4-2.7 μm) can be obtained. Only the computed samples with a dimple density (n) equal or larger than 100, preferably larger than 150, more preferably larger than 180, result in a low additional waviness. The computed samples with an area coverage (Acl)>80% show good waviness but will have a low closed void volume (not shown) due to overlapping dimples and hence a worse press performance.

Samples SC1 and SI1-I5, corresponding to computational experiments C1 and I1-I5 were prepared for further investigation. A standard steel sheet was produced and finished with hot rolling and cold rolling as known to a person skilled in the art, after cold rolling the sheet was annealed and hot dip galvanized with a zinc alloy and finished by temper rolling. As comparative example a steel sheet directly obtained from the zinc bath before temper rolling (SC7) was included, with a texture pattern obtained from the the zinc bath. For the inventive examples, the steel sheet was smooth skin passed and an additional texture pattern was applied by laser as described in WO20217125497. The results from a smooth skin passed steel sheet without a texture pattern applied is provided as comparative example SC1.

Figure 9:
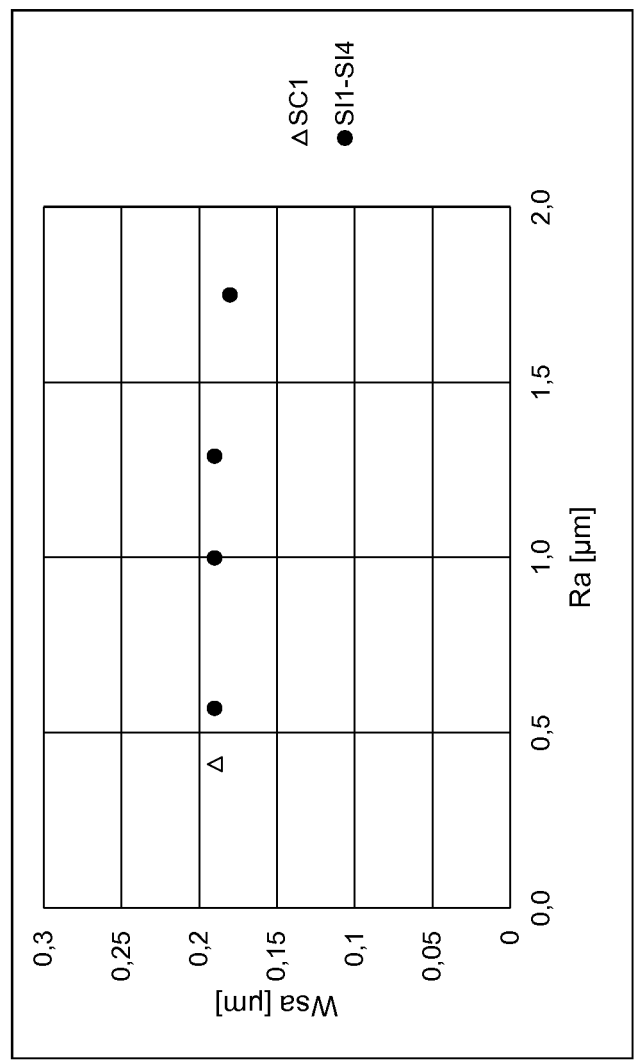

It is clear from table 2 that by applying a different texture pattern, on top of the smooth skin passes structure, according to the invention, a variety of roughness can be obtained, all with the same low increase in waviness (less than 0.05 μm) in addition to the waviness of sample SC1. FIG. 9 also underlines this decoupling of waviness and roughness.

When making more complex products, such as the outer door panel for a vehicle of FIG. 1, the flange area (texture 6) could have a surface structure according to sample SI1 with a high closed void volume and hence good press performance and galling properties whereas the panel area (texture 5) could have a surface structure according to sample SI2, having an optimized visual appearance, with a low waviness and roughness, but a medium closed void volume, whereas area 8 could have a surface corresponding to SC1. Hence by applying different surface texture a complex product with tailored properties can be obtained.

TABLE 1

Computational Samples and their calculated properties

| | | | I1 | I2 | I3 | I4 | I5 | I6 | I7 |
|---|---|---|---|---|---|---|---|---|---|
| Simulation inputs | | | | | | | | | |
| Diameter | D | μm | 55 | 40 | 48 | 32 | 80 | 50 | 25 |
| Depth | h | μm | 5.5 | 4.5 | 4.5 | 2.5 | 4 | 4 | 4 |
| Density | n | /mm^2 | 240 | 240 | 150 | 150 | 100 | 240 | 800 |
| Initial roughness | Ra_in | μm | 0.2 | 0.2 | 0.2 | 0.2 | 0.2 | 0.2 | 0.2 |
| Simulation results | | | | | | | | | |
| Roughness | Ra | μm | 1.61 | 0.97 | 0.90 | 0.33 | 1.21 | 1.17 | 1.01 |
| Peak count | Rpc | /cm | 106 | 83 | 62 | 37 | 65 | 97 | 164 |
| Waviness | Wsa | μm | 0.05 | 0.05 | 0.05 | 0.05 | 0.05 | 0.04 | 0.05 |
| Area coverage | Ac | % | 57.0% | 30.2% | 27.1% | 12.1% | 50.3% | 47.1% | 39.3% |
| Closed volume | Vcl | mm^3/m^2 | 1589 | 690 | 618 | 152 | 1009 | 951 | 812 |

| | | | C1 | C2 | C3 | C4 | C5 | C6 |
|---|---|---|---|---|---|---|---|---|
| Simulation inputs | | | | | | | | |
| Diameter | D | μm | n/a | 80 | 100 | 200 | 60 | 60 |
| Depth | h | μm | n/a | 6 | 6 | 5.5 | 6 | 10 |
| Density | n | /mm^2 | n/a | 50 | 35 | 10 | 50 | 50 |
| Initial roughness | Ra_in | μm | 0.2 | 0.2 | 0.2 | 0.2 | 0.2 | 0.2 |
| Simulation results | | | | | | | | |
| Roughness | Ra | μm | 0.19 | 1.13 | 1.23 | 1.25 | 0.71 | 1.16 |
| Peak count | Rpc | /cm | 4 | 36 | 30 | 18 | 28 | 28 |
| Waviness | Wsa | μm | 0.04 | 0.15 | 0.16 | 0.285 | 0.142 | 0.235 |
| Area coverage | Ac | % | n/a | 25.1% | 27.5% | 31.4% | 14.1% | 14.1% |
| Closed volume | Vcl | mm^3/m^2 | | 760 | 829 | 865 | 430 | 733 |

TABLE 2

Experimental samples with measured properties

| Experimental samples | | | SI1 | SI2 | SI3 | SI4 | SC1 | SC7 |
|---|---|---|---|---|---|---|---|---|
| Diameter | D | μm | 55 | 40 | 48 | 32 | | |
| Depth | h | μm | 5.5 | 4.5 | 4.5 | 2.5 | | |
| Density | n | /mm^2 | 240 | 240 | 150 | 150 | | |
| Roughness | Ra | μm | 1.75 | 1.00 | 1.29 | 0.57 | 0.41 | 0.49 |
| Peak count | Rpc | /cm | 106 | 94 | 71 | 58 | 29 | 13 |
| Waviness | Wsa | μm | 0.18 | 0.19 | 0.19 | 0.19 | 0.19 | 0.46 |
| Closed volume | Vcl | mm^3/m^2 | 1619 | 765 | 1065 | 186 | 77 | 109 |

The invention claimed is:

1. A metal substrate, provided with different texture patterns over the surface area of the metal substrate,
   wherein each said texture pattern comprises dimples which are recesses with
   a diameter in a range of 25-60 μm,
   a depth in a range of 2-6 μm and
   a density in a range of 180-600 dimples per square millimetre,
   wherein each said dimple in each texture pattern is spaced from each other said dimple to provide surface coverage of 30% to 80%;
   wherein the dimples respectively have a shape selected from the group consisting of round shape and oval shape;
   wherein the textures of said different texture patterns differ with respect to each other in at least one of diameter of the dimples, the depth of the dimples, number of dimples per surface area, positioning of the dimples, and spacing of the dimples with respect to each other.

2. The metal substrate according to claim 1, wherein the dimples having the round shape have a perimeter of a circle and the dimples having the oval shape have an oval perimeter.

3. The metal substrate according to claim 1, wherein between first and second texture patterns a transition texture pattern is applied to provide a transition between the first and second texture patterns,
   wherein the first texture transition pattern has a first said diameter of the dimples, a first said depth of the dimples, and a first said density of dimples per square millimeter of surface area that gradually change from the first diameter of the dimples, the first depth of the dimples, and the first density of dimples per surface area of the first texture pattern at a first portion of the transition texture pattern adjacent the first texture pattern to a second said diameter of the dimples, a second said depth of the dimples, and a second said density of dimples per square millimeter of the second texture pattern at a second portion of the transition texture pattern adjacent the second texture pattern.

4. The metal substrate according to claim 1, wherein the different texture patterns over the surface area of the metal substrate have a roughness Ra in a range of 0.2-3 μm, a peak count RPc in a range of 30-190 per centimetre and an arithmetic mean waviness Wsa of at most 0.35 μm.

5. The metal substrate according to claim 1, wherein the dimples respectively have the round shape with a perimeter of a circle.

6. The metal substrate according to claim 1, wherein the metal substrate is a blank or a strip.

7. The metal substrate according to claim 1, wherein the metal substrate is steel coated with a coating selected from the group consisting of Zn coating, ZnAl coating, ZnMg coating, ZnAlMg coating, Cr coating, Cr alloy coating, Sn coating, and Sn alloy coating.

8. The metal substrate according to claim 7,
   wherein the diameter of each dimple of said texture pattern is in a range of 30-60 μm.

9. The metal substrate according to claim 7, wherein the metal substrate comprises steel,
   wherein at least one said texture pattern has a roughness Ra in a range of 0.2-3 μm, a peak count RPc in a range of 30-190 per centimetre and an arithmetic mean waviness Wsa of at most 0.29 μm and
   wherein the dimples of the different texture patterns each have diameter in a range of 35-60 μm and depth in a range of 3-5 μm and density in a range of 180-500 per square millimetre.

10. The metal substrate according to claim 7, wherein the metal substrate is steel, wherein the steel comprises Interstitial Free steel or Bake Hardening steel.

11. The metal substrate according to claim 1, wherein the metal substrate is tinplate.

12. The metal substrate according to claim 1, wherein at least one of said texture patterns has a roughness Ra in a range of 0.8-1.4 μm, a peak count RPc in a range of 75-110 per centimetre and an arithmetic mean waviness Wsa of at most 0.29 μm.

13. The metal substrate according to claim 1, wherein the different texture patterns comprise dimples with the diameter in the range of 25-60 μm, depth in a range of 2-5 μm and the density in a range of 180 to 600 per square millimetre.

14. The metal substrate according to claim 1, wherein the different texture patterns comprise dimples with diameter in a range of 35-60 μm, depth in a range of 3-5 μm and density in a range of 180-500 per square millimetre.

15. The metal substrate according to claim 1,
   wherein at least one of the different texture patterns comprises
   a texture pattern tailored for friction properties that has a roughness Ra in a range of 0.2-3 μm, a peak count RPc in a range of 30-190 per centimetre and an arithmetic mean waviness Wsa of at most 0.35 μm and
   with dimples with diameter in the range of 25-60 μm and depth in the range of 2-6 μm and dimple density in a range of 180-360 per square millimetre.

16. The metal substrate according to claim 1, wherein the texture pattern has a surface coverage of 39.3% to 80%.

17. The metal substrate according to claim 1, wherein the distance between the dimples in the texture pattern in an area of the metal substrate intended for elongation in a later forming operation is adapted to the elongation to arrive at the shape of an automotive outer part by being decreased in predetermined directions in a range of 5-30% to compensate for the elongation relative to distance in corresponding predetermined directions between the dimples in the texture pattern in an area of the metal substrate not intended for elongation.

18. An elongated metal substrate comprising the metal substrate according to claim 1 provided with the different texture patterns elongated 0.5-2% as a result of temper rolling the metal substrate after the metal substrate has been provided with the different texture patterns.

19. A method for making the metal substrate provided with different texture patterns of claim 1, comprising applying surface textures on the metal substrate wherein the method comprises the steps of:
   collecting data concerning dimensions, shape, forming operation and predefined surface properties of a product which is to be made out of the metal substrate,
   applying one or more texture patterns on the metal substrate wherein the texture patterns are applied on basis of the collected data such that the product has the predefined surface properties.

20. A metal substrate, provided with different texture patterns over the surface area of the metal substrate,
   wherein each said texture pattern comprises dimples which are recesses with
   a diameter in a range of 25-60 μm,
   a depth in a range of 2-6 μm and a density in a range of 180-600 dimples per square millimetre, wherein each said dimple in each texture pattern is spaced from each other said dimple to provide surface coverage of 30% to 80%;

wherein the textures of said different texture patterns differ with respect to each other in at least one of diameter of the dimples, the depth of the dimples, number of dimples per surface area, positioning of the dimples, and spacing of the dimples with respect to each other, wherein the spacing between dimples is quasi deterministic.

* * * * *